United States Patent
Haefele et al.

(10) Patent No.: US 12,309,069 B2
(45) Date of Patent: *May 20, 2025

(54) SYSTEMS AND METHODS FOR BALANCING COMMUNICATION LOADS ACROSS COMPUTER NETWORKS BASED ON REAL-TIME CONFIRMATION OF NETWORK RESOURCE AVAILABILITY

(71) Applicant: Capital One Services, LLC, McLean, VA (US)

(72) Inventors: Lee Haefele, McLean, VA (US); Sean Hanson, McLean, VA (US); James Kennedy, McLean, VA (US); Jacob Moody, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/592,469

(22) Filed: Feb. 29, 2024

(65) Prior Publication Data

US 2024/0305568 A1  Sep. 12, 2024

Related U.S. Application Data

(63) Continuation of application No. 18/179,314, filed on Mar. 6, 2023, now Pat. No. 11,929,932.

(51) Int. Cl.
*H04L 47/125* (2022.01)
*H04L 41/22* (2022.01)
*H04L 43/062* (2022.01)
*H04L 47/70* (2022.01)
*H04L 47/80* (2022.01)

(52) U.S. Cl.
CPC ............ *H04L 47/125* (2013.01); *H04L 41/22* (2013.01); *H04L 47/801* (2013.01); *H04L 47/821* (2013.01)

(58) Field of Classification Search
CPC ... H04L 47/125; H04L 47/801; H04L 47/825; H04L 41/22
USPC ......................................................... 709/226
See application file for complete search history.

(56) References Cited

U.S. PATENT DOCUMENTS

| | | | |
|---|---|---|---|
| 7,937,470 B2 * | 5/2011 | Curley | H04L 41/12 709/224 |
| 10,116,514 B1 * | 10/2018 | Felstaine | H04L 41/0695 |
| 10,771,398 B1 * | 9/2020 | Cernoch | G06F 9/468 |
| 11,625,278 B2 * | 4/2023 | Chen | H04L 43/062 709/226 |
| 2007/0162541 A1 * | 7/2007 | Dhawan | H04L 41/0806 709/203 |

(Continued)

OTHER PUBLICATIONS

ISR and WO on PCT Appl. Ser. No. PCT/US2024/018690 Dated Jul. 25, 2024 (17 pages).

*Primary Examiner* — Ruolei Zong
(74) *Attorney, Agent, or Firm* — Foley & Lardner LLP

(57) ABSTRACT

Systems and methods balance communication loads across computer networks. In particular, the systems and methods balance the communication loads across computer networks in instances of computer communication tasks that have variable transmission confirmations and network delivery locations. Additionally or alternatively, the systems and methods balance communication loads across computer networks for computer communication tasks based on real-time confirmation of network resource availability.

20 Claims, 5 Drawing Sheets

(56) References Cited

U.S. PATENT DOCUMENTS

| | | | |
|---|---|---|---|
| 2010/0144363 A1* | 6/2010 | De Rosa | H04W 72/52 |
| | | | 455/452.1 |
| 2014/0101226 A1 | 4/2014 | Khandekar et al. | |
| 2015/0180796 A1* | 6/2015 | Chu | H04L 47/70 |
| | | | 709/226 |
| 2017/0142709 A1* | 5/2017 | Lake | H04W 72/0446 |
| 2018/0198855 A1* | 7/2018 | Wang | G06F 9/5083 |
| 2022/0050717 A1 | 2/2022 | Deng | |

\* cited by examiner

SYSTEMS AND METHODS FOR BALANCING COMMUNICATION LOADS ACROSS COMPUTER NETWORKS BASED ON REAL-TIME CONFIRMATION OF NETWORK RESOURCE AVAILABILITY

CROSS-REFERENCE TO RELATED APPLICATION(S)

This application is a continuation of U.S. patent application Ser. No. 18/179,314, filed Mar. 6, 2023. The content of the foregoing application is incorporated herein in its entirety by reference.

BACKGROUND

In recent years, telecommunication systems have grown increasingly complex. These systems are no longer limited to individual network locations and instead may span numerous locations across numerous computer networks, the Internet, and/or other platform or operating systems. Moreover, even the communications themselves are becoming more complex. For example, communications increasingly require encryption, decryption, validations, reformatting, etc., in order to be properly sent and received. Not only do each of these different "tasks" need to be completed for a given communication, but often these tasks must be undertaken by specific systems at specific locations. As the number and complexity of these communication tasks increases, the technical difficulty in efficiently balancing the load on a system created by a plurality of communications exponentially increases as well.

SUMMARY

Systems and methods are described herein for balancing communication loads across computer networks. In particular, the systems and methods balance the communication loads across computer networks in instances of computer communication tasks that have variable transmission confirmations and network delivery locations. Additionally or alternatively, the systems and methods balance communication loads across computer networks for computer communication tasks based on real-time confirmation of network resource availability.

For example, conventional systems may allocate one or more communication tasks to one or more network locations based on an expected time and/or processing power (e.g., estimated network load) required to handle the request. Following this initial allocation, however, the actual time and/or processing power (e.g., actual network load) for a given request may change. That is, when thousands of communications are being allocated and/or handled in parallel, any difference between the estimated network load and the actual network load may create inefficiencies in the system. However, simply reallocating pending and/or queued communications according to the actual network load also results in inefficiencies as some communications require specific functions to be performed at specific network locations.

Accordingly, the methods and systems describe balancing loads by reallocating communications, not only based on network load estimates, but by determining the plurality of communication tasks involved in a given communication and reallocating network loads based on load estimates corresponding to the individual communication tasks themselves. For example, individual network locations may have transmission confirmations (e.g., constraints) specific to those network locations. These individual transmission confirmations and their effect on the overall system must be considered. Accordingly, to efficiently reallocate, the system must consider numerous variables with exponentially increasing communication tasks, network locations, and status changes all in a model that can process the variables quickly enough to increase efficiency.

In some aspects, systems and methods for balancing communication loads across computer networks for computer communication tasks with variable transmission confirmations and network delivery locations are described herein. For example, the system may receive a communication, wherein the communication comprises a plurality of communication tasks for execution at a plurality of available network locations. The system may determine for each communication task of the plurality of communication tasks respective network loads. The system may determine an initial allocation for the plurality of communication tasks to the plurality of available network locations, wherein the initial allocation comprises allocating each of the plurality of communication tasks to a respective available network location of the plurality of available network locations, and wherein the initial allocation comprises a summation of the respective network loads for each of the plurality of available network locations. The system may allocate the plurality of communication tasks to the plurality of available network locations based on the initial allocation. The system may receive respective network location transmission confirmations from one or more of the plurality of available network locations. The system may determine a respective network load corresponding to the respective network location transmission confirmations. The system may determine a secondary allocation for the plurality of communication tasks to the plurality of available network locations, wherein the secondary allocation comprises a difference between the summation and the respective network load.

In some aspects, systems and methods for balancing communication loads across computer networks for computer communication tasks based on real-time confirmation of network resource availability are described. For example, the system may receive a communication, wherein the communication comprises a plurality of communication tasks for execution at a plurality of available network locations. The system may determine an initial allocation for the plurality of communication tasks to the plurality of available network locations, wherein the initial allocation comprises a summation of respective network loads for each of the plurality of communication tasks. The system may reserve an amount of network resources for the communication based on the initial allocation. The system may receive an initiation request from one or more of the plurality of available network locations, wherein the initiation request indicates the one or more of the plurality of available network locations are ready to initiate a respective communication task. The system may, in response to receiving the initiation request, transmit an approval to the one or more of the plurality of available network locations to perform the respective communication task. The system may receive a respective network location transmission confirmation from the one or more of the plurality of available network locations. The system may release a portion of the amount of the network resources corresponding to a respective network load for the respective communication task.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
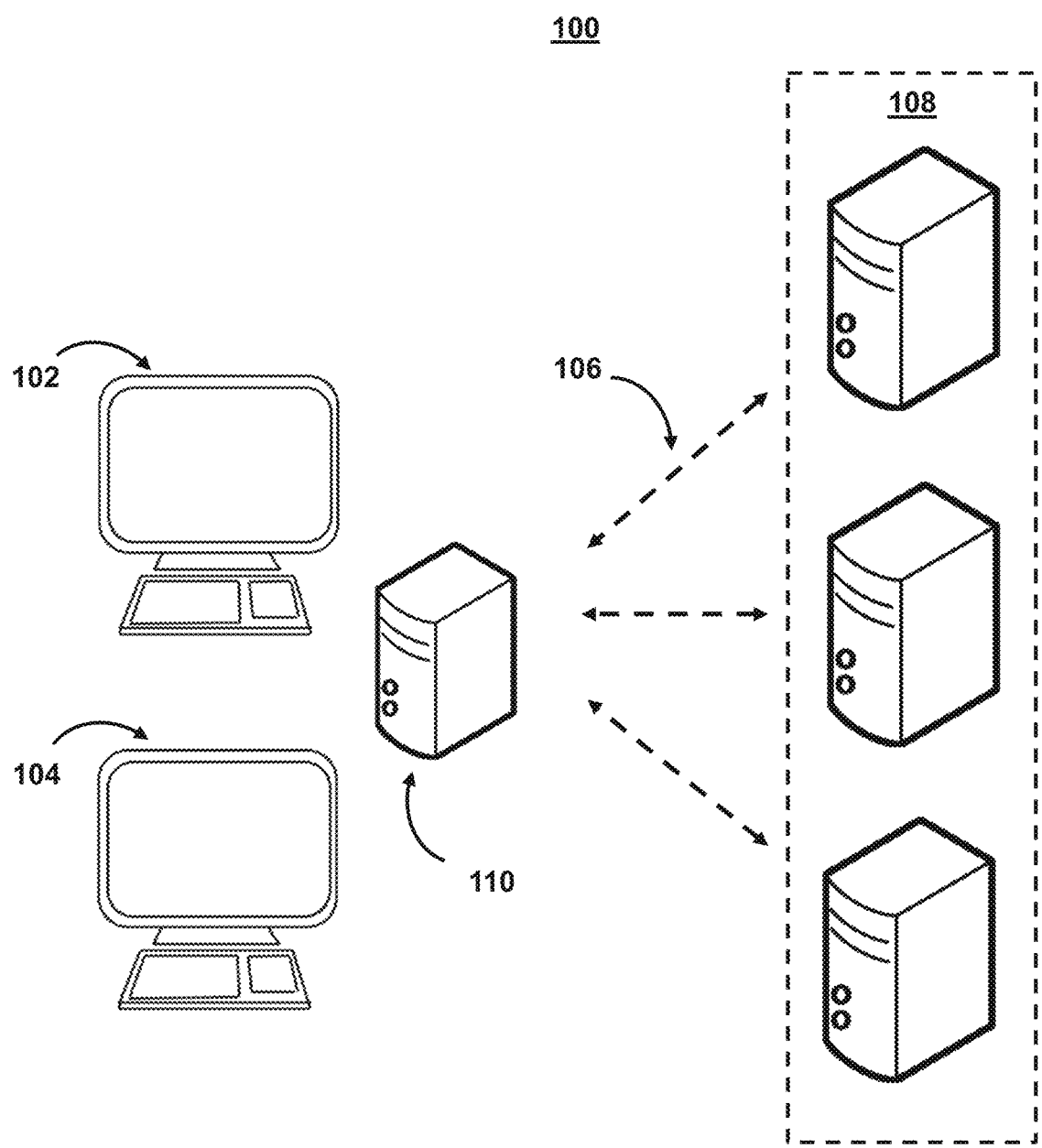
FIG. 1 shows an illustrative diagram of a system for balancing communication loads, in accordance with one or more embodiments.

FIG. 1 shows an illustrative diagram of a system for balancing communication loads across computer networks for computer communication tasks with variable transmission confirmations and network delivery locations. As shown in FIG. 1, system 100 may include user device 102, user device 104, and/or other components. Each user device may include any type of mobile terminal, fixed terminal, or other device. Each of these devices may receive content and data via input/output (I/O) paths and may also include processors and/or control circuitry to send and receive commands, requests, and other suitable data using the I/O paths. The control circuitry may comprise any suitable processing circuitry. Each of these devices may also include a user input interface and/or display for use in receiving and displaying data.

Users may, for instance, utilize one or more of the user devices to interact with one another, one or more servers, or other components of system 100. It should be noted that, while one or more operations are described herein as being performed by particular components of system 100, those operations may, in some embodiments, be performed by other components of system 100. As an example, while one or more operations are described herein as being performed by components of user device 102, those operations may, in some embodiments, be performed by components of user device 104. System 100 also includes communication path(s) 106. System 100 may then balance loads between servers (e.g., servers 108). It should also be noted that system 100 may alternatively or additionally include cloud-based components. Additionally or alternatively, one or more components may be combined, replaced, and/or alternated.

System 100 may facilitate the transmission of communications across communication path(s) 106. It should be noted that a communication may comprise any content. As referred to herein, "content" should be understood to mean an electronically consumable user asset, such as Internet content (e.g., streaming content, downloadable content, webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user-generated content may include content created and/or consumed by a user. For example, user-generated content may include content created by another, but consumed and/or published by the user.

System 100 may also include, in some embodiments, a specialized network balancer (e.g., balancer 110), which may act as a network gateway, router, and/or switches. Balancer 110 may additionally or alternatively include one or more components for balancing loads among network locations (e.g., servers 108). Balancer 110 may comprise networking hardware used in telecommunications for telecommunications networks that allows data to flow from one discrete network location to another. Balancer 110 may use more than one protocol to connect multiple networks and/or network locations (as opposed to routers or switches) and may operate at any of the seven layers of the open systems interconnection (OSI) model. It should also be noted that the functions and/or features of balancer 110 may be incorporated into one or more other components of system 100 (e.g., user device 102, user device 104, and/or software implemented thereon), and the functions and/or features of system 100 may be incorporated into balancer 110.

In some embodiments, system 100 may include cloud-based storage circuitry configured to store a list of a plurality of available network locations and respective network location transmission confirmations from one or more of the plurality of available network locations. It should be noted that as referred to herein, a network location may include a computer network location, a file network location, an Internet network location, a system location, or a Windows network location. It should also be noted that a network location may comprise, in some embodiments, other material or immaterial objects such as an account, items, warehouses, etc. For example, a network location may comprise any division and/or distinction between one or more products or services. For example, in some embodiments, a network location may comprise, or correlate to, a financial service or commitment. Accordingly, the rules set for each network location may include rules, characteristics, requirements, etc., that correspond to the network location. For example, if the network location corresponds to a financial service, contract, or other commitment, the rule set may comprise terms related to the service, contract, or commitment. In another example, a network location may comprise a location that corresponds to the delivery, receipt, and/or provision of goods or services related to an account, charge, etc.

In some embodiments, system 100 may include cloud-based storage circuitry. The circuitry may be configured to retrieve a plurality of available network locations or a plurality of communication tasks, wherein each respective communication task has a respective network load, and monitor a respective excess network load for each of the plurality of available network locations, wherein the respective excess network load comprises an amount of network load availability on a network location of the plurality of available network locations. In some embodiments, the plurality of communication tasks may correspond to processing functions for applications or programs that need to be performed (e.g., in a client-server arrangement). For example, each communication task may comprise a request, by a client device, to use the functions (e.g., processing power and/or resources) of a network location (e.g., a server). The system may then balance the load that the plurality of communication tasks comprises between the various available network locations. In such cases, the respective excess network load may comprise an amount of network load availability on a network location of the plurality of available network locations that remains after one or more communication tasks have been assigned to a given network location and/or the plurality of available network locations as a whole. The system may continuously and/or periodically monitor (e.g., via queries to individual network locations) the changes to the network loads and excesses thereof.

In some embodiments, the communication tasks may correspond to or comprise other divisions and/or distinctions between one or more products or services that need to be assigned to a given network location. For example, in some embodiments, where a network location comprises, or correlates to, a financial service or commitment, the communication tasks may comprise one or more material or immaterial products or services that need to be assigned to the network location. For example, the communication task may comprise items (or electronic designations of items) that need to be assigned to one or more commitments. In such cases, the excess network load may comprise an amount of (e.g., in terms of monetary value) shortfall or difference in the value of the items and the value required by the commitment. For example, the excess network load may comprise an amount of shortfall of a price of the collateral on a commitment of the plurality of available commitments. In another example, communication tasks may correspond to a cost to carry for each of the plurality of available commitments, wherein the respective cost to carry comprises a sum price of items on a commitment of the plurality of available commitments. Additionally or alternatively, the respective network load for each of the plurality of communication tasks may comprise a price (e.g., monetary value) of a given collateral item, market value, rating, or rule. The system may also detect changes in the network load in response to price changes, market value changes, or rating changes that triggered concentration limit breach, or rule changes that triggered eligibility breach, etc. The system may continuously and/or periodically monitor (e.g., via queries to one or more internal and/or third-party sources) the changes to the network loads and excesses thereof.

For example, in some embodiments, methods and systems are described herein for allocating heterogeneous products (e.g., products that are not infinitely divisible) to heterogeneous requestors (e.g., credit providers) subject to a set of rules and dynamic constraints based on plural states of requestors' accounts. The objective is to provide optimal solutions that satisfy all requestors' demands and comply with associated rules while minimizing a cost function that incorporates both resource carry cost and transition cost for rebalancing.

Accordingly, the methods and systems describe balancing resource allocations using communication tasks, based not only on changes to network load estimates but also on the additional network loads that reallocations, if any, create. However, once these additional criteria for reallocation are introduced, another problem arises-specifically, the complexity of the reallocation problem. For example, in many cases, individual requestors may have transmission confirmations (e.g., constraints) specific to those requestors. These individual transmission confirmations and their effect on the overall system must be considered. Accordingly, to efficiently reallocate, the system must consider numerous variables with exponentially increasing communication tasks, requestors, and status changes all in a model that can process the variables quickly enough to increase efficiency.

Figure 2:
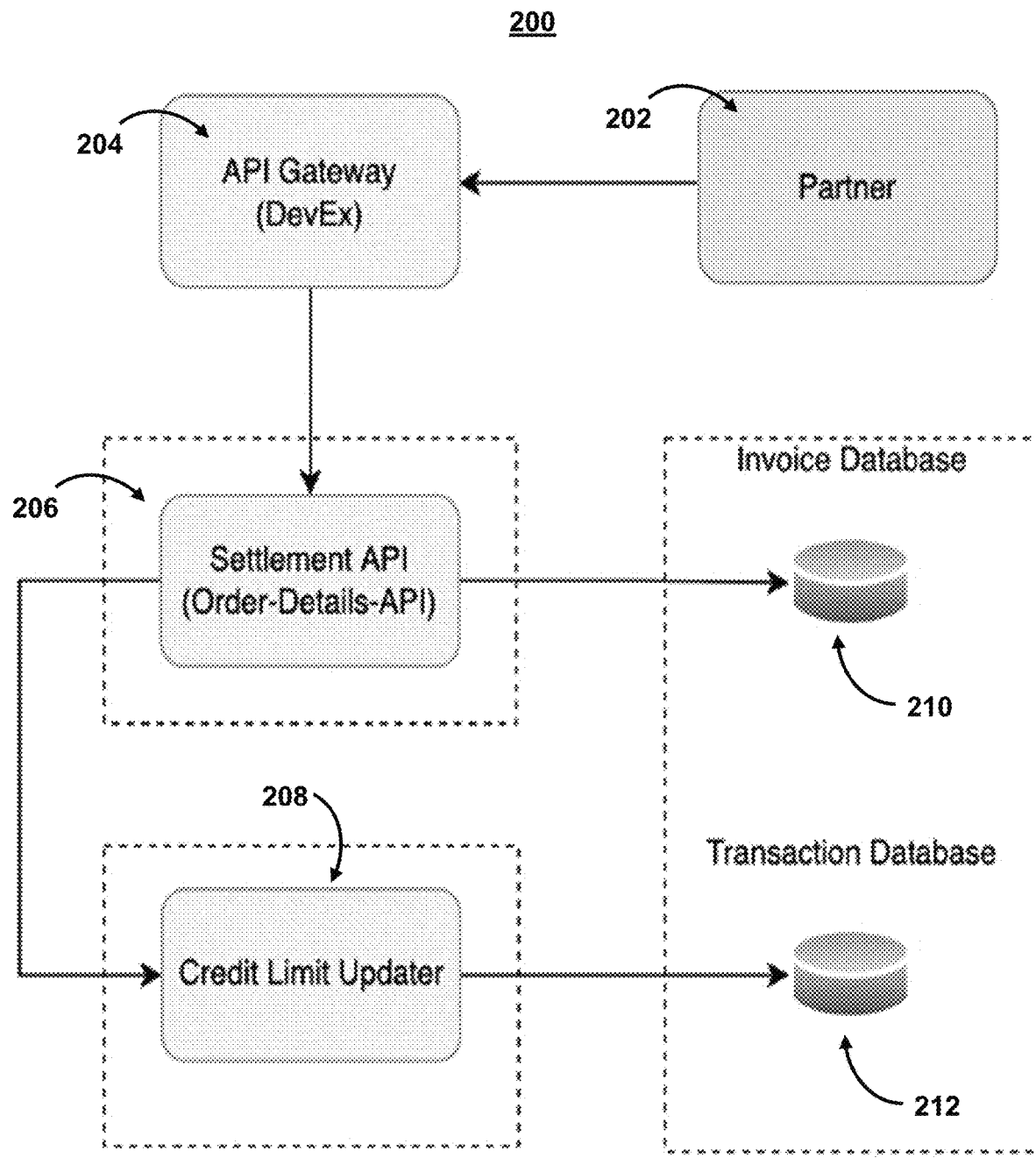
FIG. 2 shows an illustrative diagram of a system for balancing communication loads in real-time allocations in accordance with one or more embodiments.

FIG. 2 shows an illustrative diagram for a system for balancing communication loads in real-time allocations in accordance with one or more embodiments. For example, system 200 may represent an embodiment in which the communication relates to an outstanding credit account and the network load relates to an amount of the credit account. For example, system 200 may correspond to an embodiment for providing real-time authorization of credit card settlement. In particular, the system 200 may represent a credit account between a credit provider and a partner that offers branded credit accounts to a user. For example, the systems and methods described herein may relate to the settlement between a credit provider and a partner.

As shown in FIG. 2, the system may receive a communication from a partner (e.g., partner 202) via an application programming interface (API) gateway (e.g., gateway 204). For example, the partner may transmit a communication representing a user purchase on the partner's website. For example, when the user is ready to check out on a purchasing portal of the partner, the partner may send a communication comprising an authorization request. The communication may comprise a communication task (or tasks) requiring that the authorization request be approved or declined.

For example, the communication may comprise a first communication task corresponding to approving the user and a second communication task corresponding to approving an amount. As such, the communication may comprise a content identifier (e.g., corresponding to an amount, item, etc.) and a communication task name (e.g., corresponding to an authorization to be performed, a user account to validate against, etc.). For each communication task, the system may determine respective network loads. The network loads may correspond to qualitative or quantitative conditions related to each task. For example, a network load may comprise an amount of credit to be used, a frequency of use, etc.

In response, the system may determine (e.g., at gateway 204) an initial allocation for the plurality of communication tasks to the plurality of available network locations, wherein the initial allocation comprises allocating each of the plurality of communication tasks to a respective available network location of the plurality of available network locations, and wherein the initial allocation comprises a summation of the respective network loads for each of the plurality of available network locations. For example, gateway 204 may act as a network load balancer (e.g., balancer 110 (FIG. 1)). For example, the system may determine that the communication comprises a plurality of items for purchase (e.g., tasks within the communication). Each of these items may be available from different network locations (e.g., different websites, merchants, etc.). The system may then determine a network load (e.g., credit amount) corresponding to each of the tasks.

In response, gateway 204 may allocate the plurality of communication tasks to the plurality of available network locations based on the initial allocation. For example, the system may allocate available credit of the user to the various items at the various locations. The system may then await the receipt of respective network location transmission confirmations from the one or more of the plurality of available network locations. The transmission confirmations may confirm that the various items are available at the network locations and have been transmitted or delivered or are scheduled to be transmitted or delivered. For example, the transmission confirmations from the one or more of the plurality of available network locations may comprise receiving content identifiers (e.g., identifying items) for the respective network location transmission confirmations and receiving respective communication task names (e.g., names, accounts, and/or delivery details). The system may then determine respective network loads (e.g., a credit amount) corresponding to the respective network location transmission confirmations. The system may then release the network load (e.g., a credit amount) corresponding to the items and determine a secondary allocation for the plurality of communication tasks to the plurality of available network locations, wherein the secondary allocation comprises a difference between the summation and the respective network load.

For example, in response to the confirmations, the system may update the allocations (e.g., via settlement API 206) and release the network load (e.g., via credit limit updater 208). The system may then generate new allocations and/or additional information at database 210 and/or database 212. By doing so, the system may institute real-time authorization of credit purchases. Additionally or alternatively, the system may institute real-time settlement of credit card charges.

In another example, the system may provide incremental settlement of outstanding credit amounts based on the transmission and/or delivery of different content. For example, the system may receive a communication, wherein the communication comprises a plurality of communication tasks for execution at a plurality of available network locations, wherein each of the plurality of communication tasks comprises a respective content identifier and a respective communication task name. For example, a communication may comprise a large order of content. The large order (e.g., representing $1,000 in credit) may be fulfilled via multiple shipments to complete the order (e.g., four shipments of $250 each). When a shipment is released, the partner's network location may send a confirmation that includes details of the delivery.

Network location may send a confirmation that includes details about the shipment (e.g., a respective content identifier and a respective communication task name). The system may determine an initial allocation for the plurality of communication tasks to the plurality of available network locations, wherein the initial allocation comprises a summation of respective network loads for each of the plurality of communication tasks. For example, the system may allocate available credit (or settlement of outstanding credit) based on whether a shipment has been released. For example, the system may determine to reserve an amount of network resources for the communication based on the initial allocation. The system may then receive an initiation request (e.g., confirming shipment) from the one or more of the plurality of available network locations, wherein the initiation request indicates the one or more of the plurality of available network locations are ready to initiate a respective communication task. In response to receiving the initiation request, the system may transmit an approval to the one or more of the plurality of available network locations to perform the respective communication task (e.g., ship the content). For example, the system may receive the settlement detail, match it up to the original authorized order, and then use that to invoice the user.

The system may then receive a respective network location transmission confirmation from the one or more of the plurality of available network locations, wherein receiving the respective network location transmission confirmation from the one or more of the plurality of available network locations further comprises: receiving a content identifier for the respective communication task; receiving a communication task name for the respective communication task; and verifying that a portion of the amount of the network resources corresponding to the respective network load for the respective communication task is available. For example, the system may confirm that content has been shipped and, in response, the system may release the portion of the amount of the network resources corresponding to the respective network load for the respective communication task. For example, once a shipment is captured, the originating authorization is decremented by that amount of the shipment. The remaining authorized amount is until the remaining shipments are settled.

Figure 3:
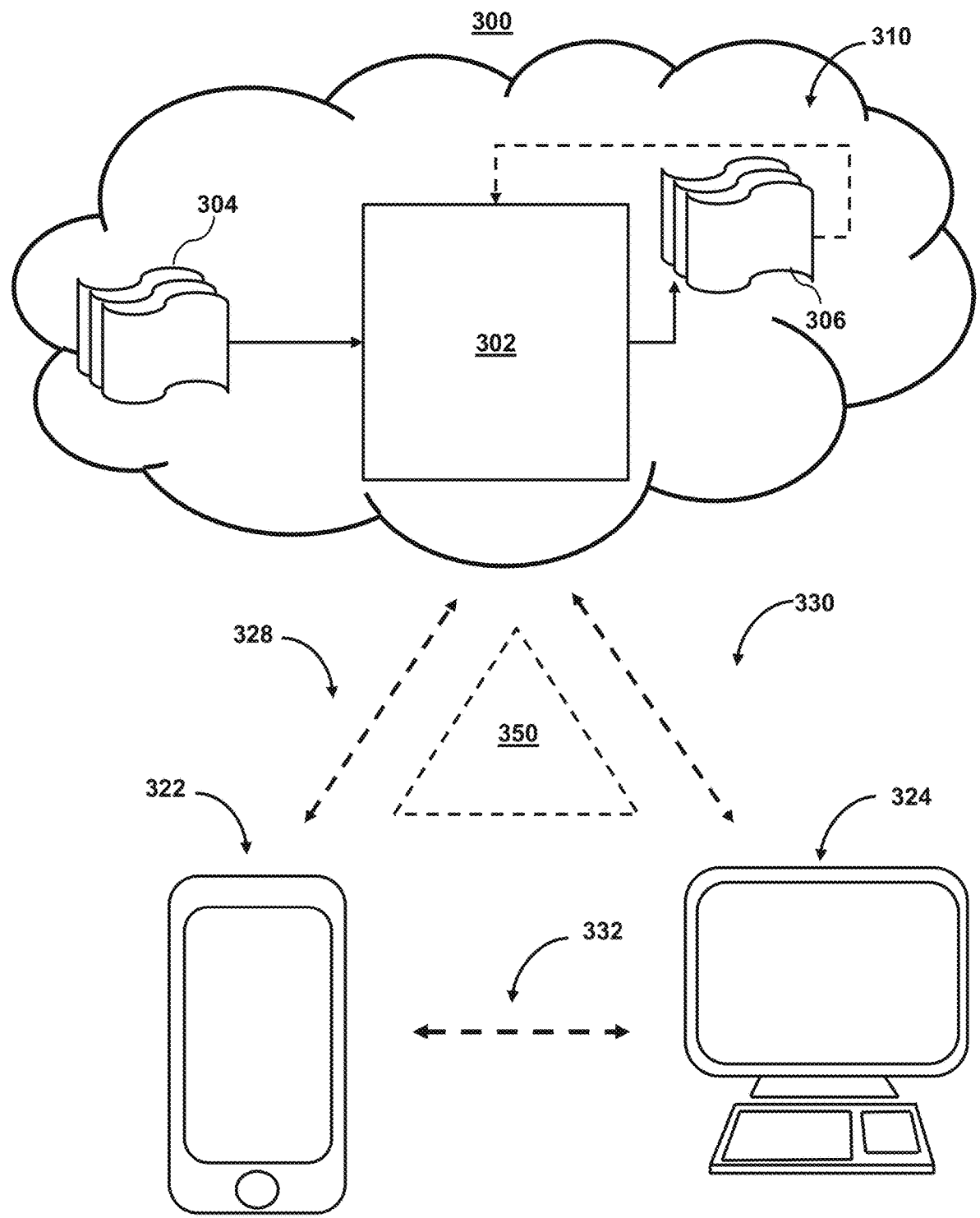
FIG. 3 shows illustrative components for a system used for balancing communication loads, in accordance with one or more embodiments.

FIG. 3 shows illustrative components for a system used for balancing communication loads, in accordance with one or more embodiments. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via I/O paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational responses, queries, and/or notifications).

Additionally, as mobile device 322 and user terminal 324 are shown as a touchscreen smartphone and a personal computer, respectively, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication paths or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., estimated loads, allocations, etc.).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether a given input corresponds to a classification of model 302 (e.g., estimated loads, allocations, etc.).

In some embodiments, the model (e.g., model 302) may automatically perform actions based on outputs 306. In some embodiments, the model (e.g., model 302) may not perform any actions. The output of the model (e.g., model 302) may be used to provided estimated loads, allocations, etc.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be a RESTful or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of their operations and the data types used to exchange information. RESTful APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: front-end layer and back-end layer, where microservices reside. In this kind of architecture, the role of the API layer 350 may provide integration between front-end and back-end layers. In such cases, API layer 350 may use RESTful APIs (exposition to front-end or even communication between microservices). API layer 350 may use AMQP (e.g., Kafka, RabbitMQ, etc.). API layer 350 may employ incipient usage of new communications protocols such as gRPC, Thrift, etc.

In some embodiments, the system architecture may use an open API approach. In such cases, API layer 350 may use commercial or open source API platforms and their modules. API layer 350 may use a developer portal. API layer 350 may use strong security constraints applying WAF and DDOS protection, and API layer 350 may use RESTful APIs as standard for external integration.

Figure 4:
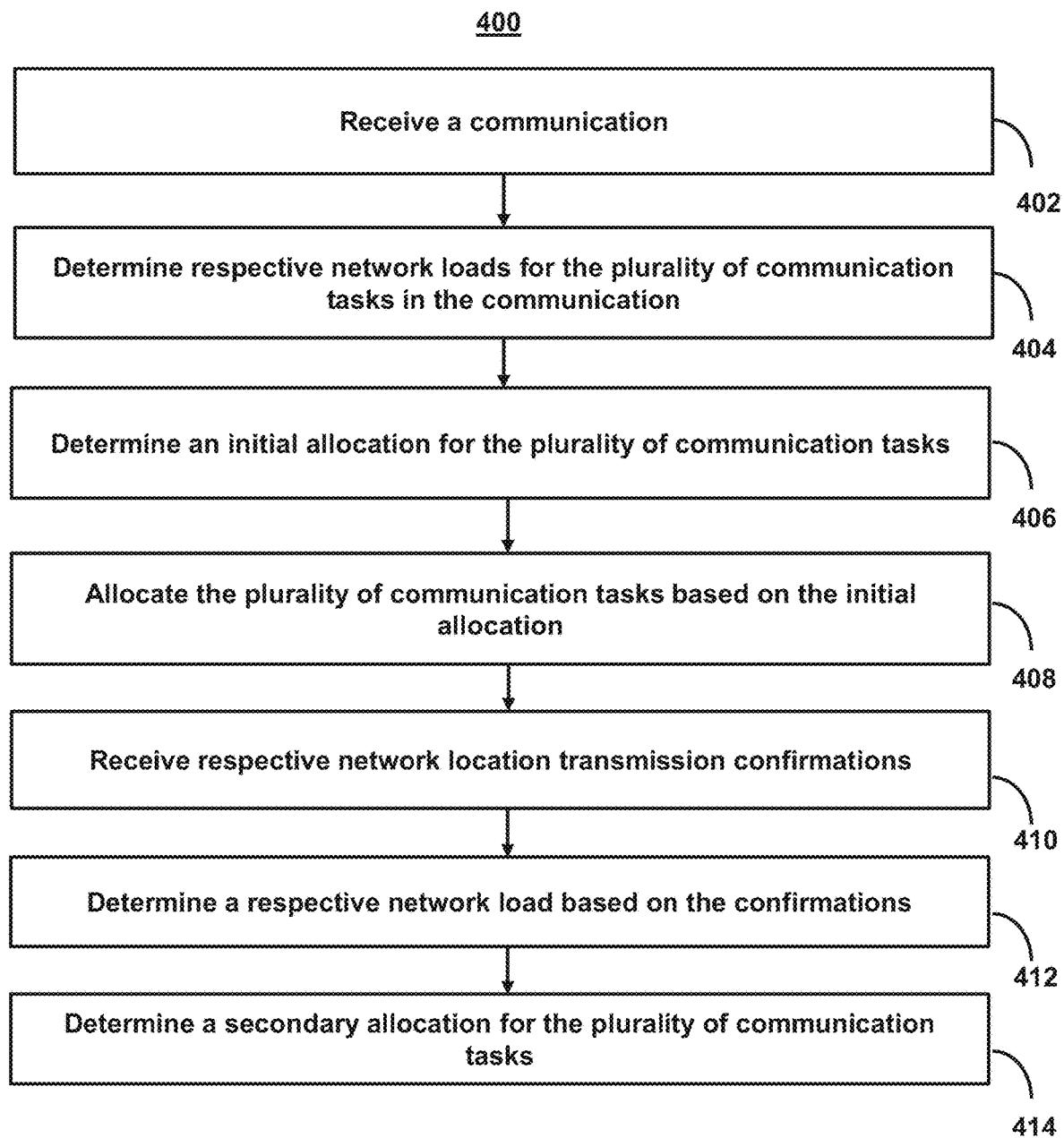
FIG. 4 shows a flowchart of the steps involved in balancing communication loads across computer networks, in accordance with one or more embodiments.

FIG. 4 shows a flowchart of the steps involved in balancing communication loads across computer networks, in accordance with one or more embodiments. For example, the system may use process 400 (e.g., as implemented on one or more system components described above) in order to balance communication loads across computer networks for computer communication tasks with variable transmission confirmations and network delivery locations.

At step 402, process 400 (e.g., using one or more components described above) receives a communication. For example, the system may receive a communication, wherein the communication comprises a plurality of communication tasks for execution at a plurality of available network locations.

For example, the system may receive a communication that comprises numerous components (e.g., communication tasks). These tasks may need to be executed by different entities across the network (e.g., at different network locations). In some embodiments, a payment platform (e.g., a credit card company) may receive a communication (e.g., corresponding to a transaction charged to a user account by one or more third parties). In some instances, that charge may itself comprise numerous components (e.g., individual items within a charge) and each of those components (e.g., the different individual items) may be subject to different delivery conditions (e.g., delivered by different third parties, delivered at different times, and/or delivered under different terms). As such, the payment platform may provide incremental settlement to the third party or parties for the charge. Each of the communication tasks may thus correspond to a different component, item, etc., within the overall communication.

In some embodiments, a payment platform (e.g., a credit card company) may receive a communication (e.g., corresponding to a transaction charged to a user account by one or more third parties). In some instances, that charge may itself comprise numerous components (e.g., individual items within a charge) and each of those components (e.g., the different individual items) may be subject to different delivery conditions (e.g., delivered by different third parties, delivered at different times, and/or delivered under different terms). As such, the payment platform may provide real-time settlement to the third party or parties for the charge. Each of the communication tasks may thus correspond to a different component, item, etc., within the overall communication.

In some embodiments, the system may receive metadata about a communication to determine the various communication tasks corresponding to a communication. For example, the system may retrieve metadata for the communication and determine the plurality of communication tasks based on the metadata. For example, the metadata may indicate particular locations, items, etc., corresponding to a given communication.

At step 404, process 400 (e.g., using one or more components described above) determines respective network loads for the plurality of communication tasks in the communication. For example, the system may determine for each communication task of the plurality of communication tasks respective network loads. For example, a respective network load may correspond to an amount of load attributed to an individual communication task. In some embodiments, this network load may correspond to a payment amount that corresponds to an item corresponding to the communication task.

In some embodiments, the system may generate a plurality of estimated network loads. For example, the system may determine a first estimated network load for a first communication task of the plurality of communication tasks based on first data in the communication. The system may determine a second estimated network load for a second communication task of the plurality of communication tasks based on second data in the communication.

At step 406, process 400 (e.g., using one or more components described above) determines an initial allocation for the plurality of communication tasks. For example, the system may determine an initial allocation for the plurality of communication tasks to the plurality of available network locations, wherein the initial allocation comprises allocating each of the plurality of communication tasks to a respective available network location of the plurality of available network locations, and wherein the initial allocation comprises a summation of the respective network loads for each of the plurality of available network locations. For example, the system may determine respective amounts for each of the respective network loads and sum the respective amounts.

For example, the system may determine a respective network load for each individual task. The system may then allocate network resources accordingly. In some embodiments, the initial allocation may correspond to a transaction charged to a user account by one or more third parties. As such, the initial allocation may be based on a summation of component charges within the overall charge. The system may determine what network locations correspond to the individual network loads. In some embodiments, the system may determine entities that are responsible for items that constitute a charge on a payment platform.

At step 408, process 400 (e.g., using one or more components described above) allocates the plurality of communication tasks based on the initial allocation. For example, the system may allocate the plurality of communication tasks to the plurality of available network locations based on the initial allocation. The system may determine what network locations correspond to the individual network loads. In some embodiments, the system may determine entities that are responsible for items that constitute a charge on a payment platform.

In some embodiments, the system may receive information about the various network locations when determining allocations. For example, the system may receive respective entity identifiers for each of the respective available network locations. The system may match one of the respective entity identifiers to each of the plurality of communication tasks.

At step 410, process 400 (e.g., using one or more components described above) receives respective network location transmission confirmations. For example, the system may receive respective network location transmission confirmations from one or more of the plurality of available network locations. For example, the system may determine that the communication task was performed.

In some embodiments, the system may receive confirmations automatically or in response to user requests. For example, the system may receive one or more status confirmations based on the communications. The system may receive a user request for a status of the communication. The system may generate for display, on a user interface, a user update based on the initial allocation.

In some embodiments, the system may receive a unique item identifier, serial number, and/or other token that identifies a respective communication task. The system may then match that identifier with a known identifier for the communication task. For example, the system may receive the respective network location transmission confirmations from the one or more of the plurality of available network locations by receiving from the one or more of the plurality of available network locations a respective unique identifier corresponding to a respective communication task of the plurality of communication tasks and verifying that the respective unique identifier is a known respective unique identifier for the respective communication task.

In some embodiments, the system may determine whether a communication task has been executed based on whether content related to the communication task has been delivered. As such, the system may receive a unique item identifier, serial number, and/or other token that identifies a respective communication task. The system may then match that identifier with a known delivery identifier. For example, the system may receive the respective network location transmission confirmations from the one or more of the plurality of available network locations by receiving from the one or more of the plurality of available network locations a respective unique identifier corresponding to a respective communication task of the plurality of communication tasks and verifying that the respective unique identifier corresponds to a known delivery identifier.

In some embodiments, the system may determine whether a communication task has been executed based on whether content related to the communication task conforms to one or more conditions. As such, the system may receive a unique item identifier, serial number, and/or other token that identifies a respective communication task. The system may then match that identifier with a known delivery condition. For example, the system may receive the respective network location transmission confirmations from the one or more of the plurality of available network locations by receiving from the one or more of the plurality of available network locations a respective unique identifier corresponding to a respective communication task of the plurality of communication tasks, retrieving a required delivery time, determining a current time, and verifying that the current time corresponds to the required delivery time.

In some embodiments, the system may receive additional information in confirmations relating to particular content and/or communication task names. For example, the system may retrieve first user record data from a first entity and second user record data from a second entity, wherein the first user record data comprises a communication task name for one or more of the plurality of communication tasks, and wherein the first entity corresponds to one or more of the plurality of available network locations. The system may then compare the first user record data to the second user record data. In another example, the system may retrieve first user record data from a first entity and second user record data from a second entity, wherein the first user record data comprises a content identifier for one or more of the plurality of communication tasks, and wherein the first entity corresponds to one or more of the plurality of available network locations. The system may then compare the first user record data to the second user record data.

At step 412, process 400 (e.g., using one or more components described above) determines a respective network load based on the confirmations. For example, the system may determine a respective network load corresponding to the respective network location transmission confirmations. For example, in response to determining that the communication task has been completed, the system may reallocate the network resources. In some embodiments, the system may determine that entities which are responsible for items that constitute a charge on a payment platform have delivered the item. As such, the payment platform may release a portion of the charge that corresponds to the delivered item.

At step 414, process 400 (e.g., using one or more components described above) determines a secondary allocation for the plurality of communication tasks. For example, the system may determine a secondary allocation for the plurality of communication tasks to the plurality of available network locations, wherein the secondary allocation comprises a difference between the summation and the respective network load. For example, the system may incrementally reduce the amount of network resources related to the communication as each of the communication tasks is completed.

For example, the system may receive updates to an existing network load and adjust the network resources accordingly. For example, the system may iteratively determine the amount of network resources required. As such, the system may determine a difference in the amount based on the one or more confirmations. The system may then adjust the allocation based on the difference. For example, the system may reserve an amount of network resources for the communication based on the initial allocation. The system may adjust the amount of the network resources based on the difference. In another example, as the system iteratively determines the amount of network resources required, the system may also iteratively release portions of the reserved network resources. For example, the system may reserve an amount of network resources for the communication based on the initial allocation. The system may release a portion of the amount of the network resources corresponding to the difference.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

Figure 5:
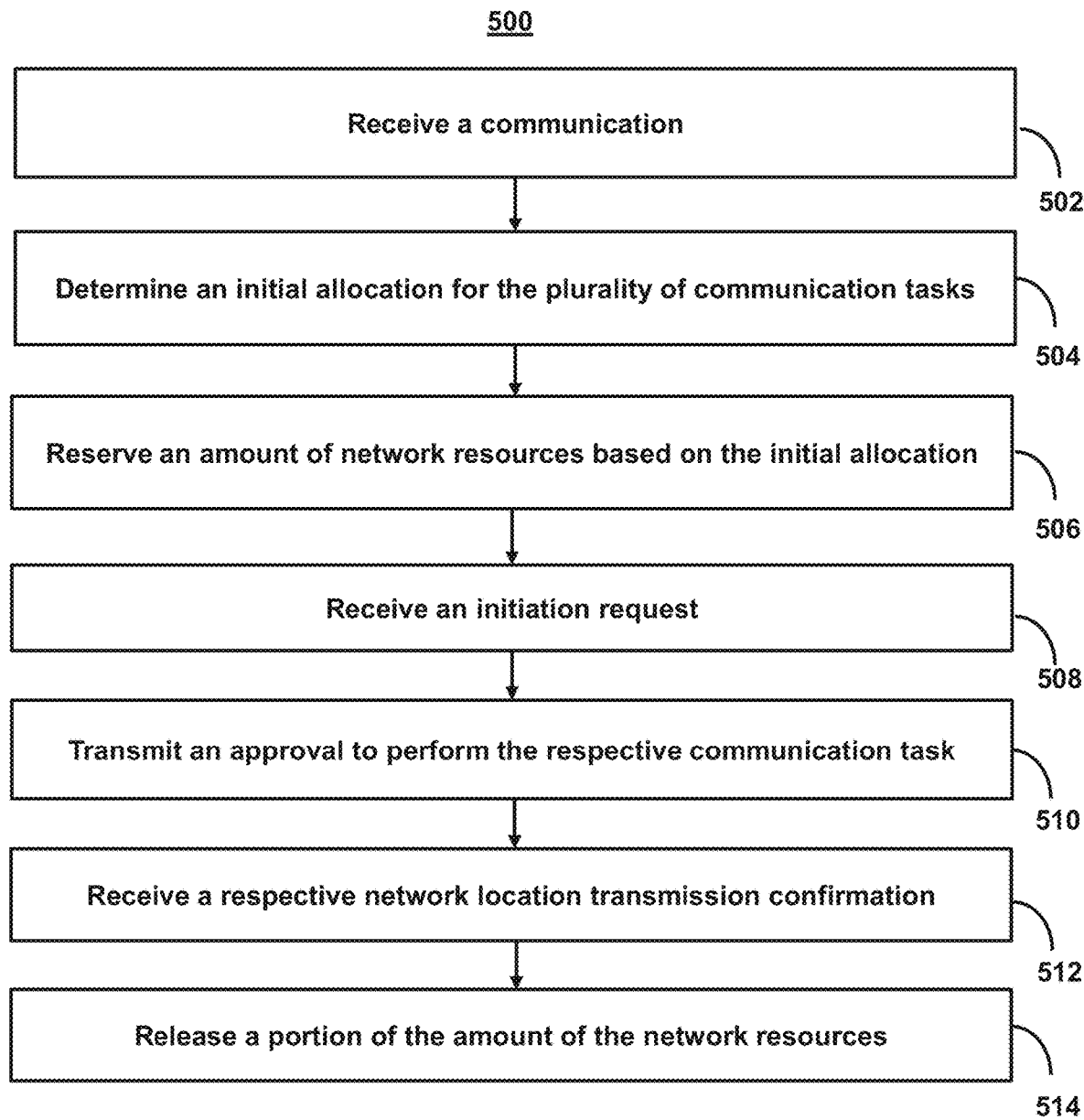
FIG. 5 shows a flowchart of the steps involved in balancing communication loads based on real-time confirmation of network resource availability, in accordance with one or more embodiments.

FIG. 5 shows a flowchart of the steps involved in balancing communication loads based on real-time confirmation of network resource availability, in accordance with one or more embodiments. For example, the system may use process 500 (e.g., as implemented on one or more system components described above) in order to balance communication loads across computer networks for computer communication tasks based on real-time confirmation of network resource availability.

At step 502, process 500 (e.g., using one or more components described above) receives a communication. For example, the system may receive a communication, wherein the communication comprises a plurality of communication tasks for execution at a plurality of available network locations. For example, the system may receive a communication that comprises numerous components (e.g., communication tasks). These tasks may need to be executed by different entities across the network (e.g., at different network locations). In some embodiments, a payment platform (e.g., a credit card company) may receive a communication (e.g., corresponding to a transaction charged to a user account by one or more third parties). In some instances, that charge may itself comprise numerous components (e.g., individual items within a charge) and each of those components (e.g., the different individual items) may be subject to different delivery conditions (e.g., delivered by different third parties, delivered at different times, and/or delivered under different terms). As such, the payment platform may provide incremental settlement to the third party or parties for the charge. Each of the communication tasks may thus correspond to a different component, item, etc., within the overall communication.

In some embodiments, a payment platform (e.g., a credit card company) may receive a communication (e.g., corresponding to a transaction charged to a user account by one or more third parties). In some instances, that charge may itself comprise numerous components (e.g., individual items within a charge) and each of those components (e.g., the different individual items) may be subject to different delivery conditions (e.g., delivered by different third parties, delivered at different times, and/or delivered under different terms). As such, the payment platform may provide incremental, real-time settlement to the third party or parties for the charge. Each of the communication tasks may thus correspond to a different component, item, etc., within the overall communication.

At step 504, process 500 (e.g., using one or more components described above) determines an initial allocation for the plurality of communication tasks. For example, the system may determine an initial allocation for the plurality of communication tasks to the plurality of available network locations, wherein the initial allocation comprises a summation of respective network loads for each of the plurality of communication tasks. For example, the system may determine an initial allocation (e.g., a total settlement amount) for the communication (e.g., charge). The initial allocation (e.g., the amount charged against an account of the user) may comprise a summation of the individual amounts corresponding to the component, items, etc.

For example, the system may determine a respective network load for each individual task. The system may then allocate network resources accordingly. In some embodiments, the initial allocation may correspond to a transaction charged to a user account by one or more third parties. As such, the initial allocation may be based on a summation of component charges within the overall charge. The system may determine what network locations correspond to the individual network loads. In some embodiments, the system may determine entities that are responsible for items that constitute a charge on a payment platform.

At step 506, process 500 (e.g., using one or more components described above) reserves an amount of network resources based on the initial allocation. For example, the system may reserve an amount of network resources for the communication based on the initial allocation. For example, the system may reserve network resources in the amount needed to handle the communication. In some embodiments, such as those relating to payment providers, the network resources may comprise amounts in a credit account.

In some embodiments, the system may receive information about the various locations when determining allocations. For example, the system may receive respective entity identifiers for each of the respective available network locations. The system may match one of the respective entity identifiers to each of the plurality of communication tasks.

At step 508, process 500 (e.g., using one or more components described above) receives an initiation request. For example, the system may receive an initiation request from the one or more of the plurality of available network locations, wherein the initiation request indicates the one or more of the plurality of available network locations are ready to initiate a respective communication task. For example, the one or more of the plurality of available network locations may confirm that it is able to perform the communication task.

In some embodiments, the initiation request may include a plurality of information types. The initiation request may include information used to identify content, communication tasks, etc. For example, the system may receive a content identifier for the respective communication task. The system may receive a communication task name for the respective communication task. The system may verify that the portion is available for the respective communication task.

At step 510, process 500 (e.g., using one or more components described above) receives a communication. For example, the system may transmit an approval to perform the respective communication task. For example, the system may, in response to receiving the initiation request, transmit an approval to the one or more of the plurality of available network locations to perform the respective communication task. For example, in response to the one or more of the plurality of available network locations confirming that it is able to perform the communication task, the system may authorize the task to be performed.

At step 512, process 500 (e.g., using one or more components described above) receives a respective network location transmission confirmation. For example, the system may receive a respective network location transmission confirmation from the one or more of the plurality of available network locations.

In some embodiments, the system may receive confirmations automatically or in response to user requests. For example, the system may receive one or more status confirmations based on the communications. The system may receive a user request for a status of the communication. The system may generate for display, on a user interface, a user update based on the initial allocation.

In some embodiments, the system may receive a unique item identifier, serial number, and/or other token that identifies a respective communication task. The system may then match that identifier with a known identifier for the communication task. For example, the system may receive the respective network location transmission confirmations from the one or more of the plurality of available network locations by receiving from the one or more of the plurality of available network locations a respective unique identifier corresponding to a respective communication task of the plurality of communication tasks and verifying that the respective unique identifier is a known respective unique identifier for the respective communication task.

In some embodiments, the system may determine whether a communication task has been executed based on whether content related to the communication task has been delivered. As such, the system may receive a unique item identifier, serial number, and/or other token that identifies a respective communication task. The system may then match that identifier with a known delivery identifier. For example, the system may receive the respective network location transmission confirmations from the one or more of the plurality of available network locations by receiving from the one or more of the plurality of available network locations a respective unique identifier corresponding to a respective communication task of the plurality of communication tasks and verifying that the respective unique identifier corresponds to a known delivery identifier.

In some embodiments, the system may determine whether a communication task has been executed based on whether content related to the communication task conforms to one or more conditions. As such, the system may receive a unique item identifier, serial number, and/or other token that identifies a respective communication task. The system may then match that identifier with a known delivery condition. For example, the system may receive the respective network location transmission confirmations from the one or more of the plurality of available network locations by receiving from the one or more of the plurality of available network locations a respective unique identifier corresponding to a respective communication task of the plurality of communication tasks, retrieving a required delivery time, determining a current time, and verifying that the current time corresponds to the required delivery time.

In some embodiments, the system may receive additional information in confirmations relating to particular content and/or communication task names. For example, the system may retrieve first user record data from a first entity and second user record data from a second entity, wherein the first user record data comprises a communication task name for one or more of the plurality of communication tasks, and wherein the first entity corresponds to one or more of the plurality of available network locations. The system may then compare the first user record data to the second user record data. In another example, the system may retrieve first user record data from a first entity and second user record data from a second entity, wherein the first user record data comprises a content identifier for one or more of the plurality of communication tasks, and wherein the first entity corresponds to one or more of the plurality of available network locations. The system may then compare the first user record data to the second user record data.

At step 514, process 500 (e.g., using one or more components described above) releases a portion of the amount of the network resources. For example, the system may release a portion of the amount of the network resources corresponding to the respective network load for the respective communication task. In some embodiments, the system may determine a respective network load corresponding to the respective network location transmission confirmations. The system may then determine a secondary allocation for the plurality of communication tasks to the plurality of available network locations, wherein the secondary allocation comprises a difference between the summation and the respective network load.

For example, the system may receive updates to an existing network load and adjust the network resources accordingly. For example, the system may iteratively determine the amount of network resources required. As such, the system may determine a difference in the amount based on the one or more confirmations. The system may then adjust the allocation based on the difference. For example, the system may reserve an amount of network resources for the communication based on the initial allocation. The system may adjust the amount of the network resources based on the difference. In another example, as the system iteratively determines the amount of network resources required, the system may also iteratively release portions of the reserved network resources. For example, the system may reserve an amount of network resources for the communication based on the initial allocation. The system may release a portion of the amount of the network resources corresponding to the difference.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for balancing communication loads across computer networks for computer communication tasks with variable transmission confirmations and network delivery locations.

2. A method for balancing communication loads across computer networks for computer communication tasks based on real-time confirmation of network resource availability.

3. The method of any one of the preceding embodiments, further comprising: receiving a communication, wherein the communication comprises a plurality of communication tasks for execution at a plurality of available network locations; determining for each communication task of the plurality of communication tasks respective network loads; determining an initial allocation for the plurality of communication tasks to the plurality of available network locations, wherein the initial allocation comprises allocating each of the plurality of communication tasks to a respective available network location of the plurality of available network locations, and wherein the initial allocation comprises a summation of the respective network loads for each of the plurality of available network locations; allocating the plurality of communication tasks to the plurality of available network locations based on the initial allocation; receiving respective network location transmission confirmations from one or more of the plurality of available network locations; determining a respective network load corresponding to the respective network location transmission confirmations; and determining a secondary allocation for the plurality of communication tasks to the plurality of available network locations, wherein the secondary allocation comprises a difference between the summation and the respective network load.

4. The method of any one of the preceding embodiments, further comprising: reserving an amount of network resources for the communication based on the initial allocation; and releasing a portion of the amount of the network resources corresponding to the difference.

5. The method of any one of the preceding embodiments, further comprising: receiving a user request for a status of the communication; and generating for display, on a user interface, a user update based on the initial allocation.

6. The method of any one of the preceding embodiments, wherein determining for each respective communication task the respective network load further comprises: determining a first estimated network load for a first communication task of the plurality of communication tasks based on first data in the communication; and determining a second estimated network load for a second communication task of the plurality of communication tasks based on second data in the communication.

7. The method of any one of the preceding embodiments, wherein receiving the respective network location transmission confirmations from the one or more of the plurality of available network locations further comprises: receiving from the one or more of the plurality of available network locations a respective unique identifier corresponding to a respective communication task of the plurality of communication tasks; and verifying that the respective unique identifier is a known respective unique identifier for the respective communication task.

8. The method of any one of the preceding embodiments, wherein receiving the respective network location transmission confirmations from the one or more of the plurality of available network locations further comprises: receiving from the one or more of the plurality of available network locations a respective unique identifier corresponding to a respective communication task of the plurality of communication tasks; and verifying that the respective unique identifier corresponds to a known delivery identifier.

9. The method of any one of the preceding embodiments, wherein receiving the respective network location transmission confirmations from the one or more of the plurality of available network locations further comprises: receiving from the one or more of the plurality of available network locations a respective unique identifier corresponding to a respective communication task of the plurality of communication tasks; retrieving a required delivery time; determining a current time; and verifying that the current time corresponds to the required delivery time.

10. The method of any one of the preceding embodiments, further comprising: retrieving metadata for the communication; and determining the plurality of communication tasks based on the metadata.

11. The method of any one of the preceding embodiments, wherein determining the initial allocation further comprises: determining respective amounts for each of the respective network loads; and summing the respective amounts.

12. The method of any one of the preceding embodiments, wherein allocating each of the plurality of communication tasks to the respective available network location of the plurality of available network locations further comprises: receiving respective entity identifiers for each of the respective available network locations; and matching one of the respective entity identifiers to each of the plurality of communication tasks.

13. The method of any one of the preceding embodiments, wherein receiving the respective network location transmission confirmations from the one or more of the plurality of available network locations further comprises: retrieving first user record data from a first entity and second user record data from a second entity, wherein the first user record data comprises a communication task name for one or more of the plurality of communication tasks, and wherein the first entity corresponds to one or more of the plurality of available network locations; and comparing the first user record data to the second user record data.

14. The method of any one of the preceding embodiments, wherein receiving the respective network location transmission confirmations from the one or more of the plurality of available network locations further comprises: retrieving first user record data from a first entity and second user record data from a second entity, wherein the first user record data comprises a content identifier for one or more of the plurality of communication tasks, and wherein the first entity corresponds to one or more of the plurality of available network locations; and comparing the first user record data to the second user record data.

15. The method of any one of the preceding embodiments, further comprising: reserving an amount of network resources for the communication based on the initial allocation; and adjusting the amount of the network resources based on the difference.

16. The method of any one of the preceding embodiments, further comprising: receiving a communication, wherein the communication comprises a plurality of communication tasks for execution at a plurality of available network locations; determining an initial allocation for the plurality of communication tasks to the plurality of available network locations, wherein the initial allocation comprises a summation of respective network loads for each of the plurality of communication tasks; reserving an amount of network resources for the communication based on the initial allocation; receiving an initiation request from the one or more of the plurality of available network locations, wherein the initiation request indicates the one or more of the plurality of available network locations are ready to initiate a respective communication task; in response to receiving the initiation request, transmitting an approval to the one or more of the plurality of available network locations to perform the respective communication task; receiving a respective network location transmission confirmation from the one or more of the plurality of available network locations; and releasing a portion of the amount of the network resources corresponding to the respective network load for the respective communication task.

17. The method of any one of the preceding embodiments, further comprising: determining a respective network load corresponding to the respective network location transmission confirmations; and determining a secondary allocation for the plurality of communication tasks to the plurality of available network locations, wherein the secondary allocation comprises a difference between the summation and the respective network load.

18. The method of any one of the preceding embodiments, further comprising: retrieving metadata for the communication; and determining the plurality of communication tasks based on the metadata.

19. The method of any one of the preceding embodiments, further comprising: receiving a user request for a status of the communication; and generating for display, on a user interface, a user update based on the initial allocation.

20. The method of any one of the preceding embodiments, wherein determining for each respective communication task the respective network load further comprises: determining a first estimated network load for a first communication task of the plurality of communication tasks based on first data in the communication; and determining a second estimated network load for a second communication task of the plurality of communication tasks based on second data in the communication.

21. The method of any one of the preceding embodiments, wherein receiving the respective network location transmission confirmations from the one or more of the plurality of available network locations further comprises: receiving from the one or more of the plurality of available network locations a respective unique identifier corresponding to a respective communication task of the plurality of communication tasks; and verifying that the respective unique identifier is a known respective unique identifier for the respective communication task.

22. The method of any one of the preceding embodiments, wherein receiving the respective network location transmission confirmations from the one or more of the plurality of available network locations further comprises: receiving from the one or more of the plurality of available network locations a respective unique identifier corresponding to a respective communication task of the plurality of communication tasks; and verifying that the respective unique identifier corresponds to a known delivery identifier.

23. The method of any one of the preceding embodiments, wherein receiving the respective network location transmission confirmations from the one or more of the plurality of available network locations further comprises: receiving from the one or more of the plurality of available network locations a respective unique identifier corresponding to a respective communication task of the plurality of communication tasks; retrieving a required delivery time; determining a current time; and verifying that the current time corresponds to the required delivery time.

24. The method of any one of the preceding embodiments, wherein determining the initial allocation further comprises: determining respective amounts for each of the respective network loads; and summing the respective amounts.

25. The method of any one of the preceding embodiments, wherein allocating each of the plurality of communication tasks to the respective available network location of the plurality of available network locations further comprises: receiving respective entity identifiers for each of the respective available network locations; and matching one of the respective entity identifiers to each of the plurality of communication tasks.

26. The method of any one of the preceding embodiments, wherein receiving the respective network location transmission confirmation from the one or more of the plurality of available network locations further comprises: retrieving first user record data from a first entity and second user record data from a second entity, wherein the first user record data comprises a communication task name for one or more of the plurality of communication tasks, and wherein the first entity corresponds to one or more of the plurality of available network locations; and comparing the first user record data to the second user record data.

27. The method of any one of the preceding embodiments, wherein receiving the respective network location transmission confirmations from the one or more of the plurality of available network locations further comprises: retrieving first user record data from a first entity and second user record data from a second entity, wherein the first user record data comprises a content identifier for one or more of the plurality of communication tasks, and wherein the first entity corresponds to one or more of the plurality of available network locations; and comparing the first user record data to the second user record data.

28. The method of any one of the preceding embodiments, wherein receiving the initiation request from the one or more of the plurality of available network locations further comprises: receiving a content identifier for the respective communication task; receiving a communication task name for the respective communication task; and verifying that the portion is available for the respective communication task.

29. A tangible, non-transitory, machine-readable medium storing instructions that, when executed by a data processing apparatus, cause the data processing apparatus to perform operations comprising those of any of embodiments 1-28.

30. A system comprising one or more processors; and memory storing instructions that, when executed by the processors, cause the processors to effectuate operations comprising those of any of embodiments 1-28.

31. A system comprising means for performing any of embodiments 1-28.

What is claimed is:

1. A system of balancing communication loads across computer networks for computer communication tasks based on real-time confirmation of network resource availability, the system comprising:
one or more processors; and
a non-transitory, computer readable medium comprising instructions that when executed by the one or more processors cause operations comprising:
receiving a communication, wherein the communication comprises a plurality of communication tasks for execution at a plurality of available network locations, wherein each of the plurality of communication tasks comprises a respective content identifier and a respective communication task name;
determining an initial allocation for the plurality of communication tasks to the plurality of available network locations;
reserving an amount of network resources for the communication based on the initial allocation;
receiving an initiation request from one or more of the plurality of available network locations, wherein the initiation request indicates the one or more of the plurality of available network locations are ready to initiate a respective communication task;
in response to receiving the initiation request, transmitting an approval to the one or more of the plurality of available network locations;
receiving a respective network location transmission confirmation from the one or more of the plurality of available network locations, wherein receiving the respective network location transmission confirmation from the one or more of the plurality of available network locations comprises:
receiving a content identifier for the respective communication task;
receiving a communication task name for the respective communication task; and
verifying that a portion of the amount of the network resources corresponding to a respective network load for the respective communication task is available.

2. A method, the method comprising:
receiving a communication, wherein the communication comprises a plurality of communication tasks for execution at a plurality of available network locations;
determining an initial allocation for the plurality of communication tasks to the plurality of available network locations;
reserving an amount of network resources for the communication based on the initial allocation;
receiving an initiation request from one or more of the plurality of available network locations, wherein the initiation request indicates the one or more of the plurality of available network locations are ready to initiate a respective communication task;
in response to receiving the initiation request, transmitting an approval to the one or more of the plurality of available network locations; and
receiving a respective network location transmission confirmation from the one or more of the plurality of available network locations.

3. The method of claim 2, further comprising:
determining a respective network load corresponding to the respective network location transmission confirmation; and
determining a secondary allocation for the plurality of communication tasks to the plurality of available network locations, wherein the secondary allocation comprises a difference between a summation of respective network loads for each of the plurality of communication tasks and the respective network load.

4. The method of claim 2, further comprising:
retrieving metadata for the communication; and
determining the plurality of communication tasks based on the metadata.

5. The method of claim 2, further comprising:
receiving a user request for a status of the communication; and
generating for display, on a user interface, a user update based on the initial allocation.

6. The method of claim 3, wherein determining for each respective communication task the respective network load further comprises:
determining a first estimated network load for a first communication task of the plurality of communication tasks based on first data in the communication; and
determining a second estimated network load for a second communication task of the plurality of communication tasks based on second data in the communication.

7. The method of claim 2, wherein receiving the respective network location transmission confirmation from the one or more of the plurality of available network locations further comprises:
receiving from the one or more of the plurality of available network locations a respective unique identifier corresponding to a respective communication task of the plurality of communication tasks; and
verifying that the respective unique identifier a known respective unique identifier for the respective communication task.

8. The method of claim 2, wherein receiving the respective network location transmission confirmation from the one or more of the plurality of available network locations further comprises:
receiving from the one or more of the plurality of available network locations a respective unique identifier corresponding to a respective communication task of the plurality of communication tasks; and
verifying that the respective unique identifier corresponds to a known delivery identifier.

9. The method of claim 2, wherein receiving the respective network location transmission confirmation from the one or more of the plurality of available network locations further comprises:
receiving from the one or more of the plurality of available network locations a respective unique identifier corresponding to a respective communication task of the plurality of communication tasks;
retrieving a required delivery time;
determining a current time; and
verifying that the current time corresponds to the required delivery time.

10. The method of claim 3, wherein determining the initial allocation further comprises:
determining respective amounts for each of the respective network loads; and
summing the respective amounts.

11. The method of claim 2, wherein allocating each of the plurality of communication tasks to the respective available network location of the plurality of available network locations further comprises:
receiving respective entity identifiers for each of the respective available network location; and
matching one of the respective entity identifiers to each of the plurality of communication tasks.

12. The method of claim 2, wherein receiving the respective network location transmission confirmation from the one or more of the plurality of available network locations further comprises:
retrieving first user record data from a first entity and second user record data from a second entity, wherein the first user record data comprises a communication task name for one or more of the plurality of communication tasks, and wherein the first entity corresponds to one or more of the plurality of available network locations; and
comparing the first user record data to the second user record data.

13. The method of claim 2, wherein receiving the respective network location transmission confirmations from the one or more of the plurality of available network locations further comprises:
retrieving first user record data from a first entity and second user record data from a second entity, wherein the first user record data comprises a content identifier for one or more of the plurality of communication tasks, and wherein the first entity corresponds to one or more of the plurality of available network locations; and
comparing the first user record data to the second user record data.

14. The method of claim 2, wherein receiving the respective network location transmission confirmation from the one or more of the plurality of available network locations further comprises:
receiving a content identifier for the respective communication task;
receiving a communication task name for the respective communication task; and
verifying that a portion of the amount of the network resources corresponding to a respective network load for the respective communication task is available for the respective communication task.

15. A non-transitory, computer readable medium comprising instructions that when executed by one or more processors cause operations comprising:
receiving a communication, wherein the communication comprises a plurality of communication tasks for execution at a plurality of available network locations;
determining an initial allocation for the plurality of communication tasks to the plurality of available network locations;
reserving an amount of network resources for the communication based on the initial allocation;
receiving an initiation request from one or more of the plurality of available network locations, wherein the initiation request indicates the one or more of the plurality of available network locations are ready to initiate a respective communication task;
in response to receiving the initiation request, transmitting an approval to the one or more of the plurality of available network locations; and
receiving a respective network location transmission confirmation from the one or more of the plurality of available network locations.

16. The non-transitory, computer readable medium of claim 15, further comprising:
determining a respective network load corresponding to the respective network location transmission confirmation; and
determining a secondary allocation for the plurality of communication tasks to the plurality of available network locations.

17. The non-transitory, computer readable medium of claim 15, further comprising:
retrieving metadata for the communication; and
determining the plurality of communication tasks based on the metadata.

18. The non-transitory, computer readable medium of claim 15, further comprising:
receiving a user request for a status of the communication; and
generating for display, on a user interface, a user update based on the initial allocation.

19. The non-transitory, computer readable medium of claim 16, wherein determining for each respective communication task the respective network load further comprises:
determining a first estimated network load for a first communication task of the plurality of communication tasks based on first data in the communication; and
determining a second estimated network load for a second communication task of the plurality of communication tasks based on second data in the communication.

20. The non-transitory, computer readable medium of claim 15, wherein receiving the respective network location transmission confirmation from the one or more of the plurality of available network locations further comprises:
receiving from the one or more of the plurality of available network locations a respective unique identifier corresponding to a respective communication task of the plurality of communication tasks; and
verifying that the respective unique identifier a known respective unique identifier for the respective communication task.

* * * * *